United States Patent [19]
Helm

[11] 3,859,639
[45] Jan. 7, 1975

[54] OPTICAL APPARATUS FOR ESTABLISHING LOGICAL RELATIONSHIPS AND FOR STORING

[75] Inventor: Uwe Helm, Rechter Allee, Germany

[73] Assignee: U.S. Philips Corporation, New York, N.Y.

[22] Filed: Aug. 20, 1973

[21] Appl. No.: 390,170

[30] Foreign Application Priority Data
Aug. 23, 1972 Germany .......................... 2241461

[52] U.S. Cl. ...................... 340/173 LS, 340/172.5
[51] Int. Cl. ........................................ G11c 11/42
[58] Field of Search.. 340/173 LM, 173 LT, 173 LS

[56] References Cited
UNITED STATES PATENTS
3,792,449 2/1974 Kazan .......................... 340/173 LS

*Primary Examiner*—Terrell W. Fears
*Attorney, Agent, or Firm*—Frank R. Trifari; Simon L. Cohen

[57] ABSTRACT

The arrangement includes a component made of a Pockels-effect crystal, for example a KDP crystal, one major face of which is coated with a dielectric mirror. In front of this mirror a photocathode and an image-forming electron-optical system may be provided or the mirror may be directly coated with a photosemiconductor, whilst the signals which are to be stored or between which logical relationships are to be established and which contain a plurality of binary elements in a two-dimensional intensity distribution are directed onto the said photosensitive layer, causing a corresponding charges image to be produced on the dielectric mirror. This charge rotates the plane pf polarization of a plane-polarized light signal which impinges on the crystal, passes through it and is reflected at the dielectric mirror so as to emerge again from the crystal. When the emerging light signal passes through an analyser, an intensity-modulated image is produced again. The analyser preferably is a polarizing beam splitter. According to operational conditions, in particular to the bias voltage set up between the photosemiconductor and the crystal, an OR function or an exclusive-OR function may thus be realized. A negation also may be achieved by a suitable choice of the operating conditions or by inserting a component which rotates light passing through it through 45° at a point of the ray path preceding the crystal. When the light signal which emerges from the crystal is directed onto the crystal of another component, an AND function may be achieved. By making combinations more elaborate logic functions also may be formed.

9 Claims, 5 Drawing Figures

OPTICAL APPARATUS FOR ESTABLISHING LOGICAL RELATIONSHIPS AND FOR STORING

The invention relates to an apparatus for establishing logical relationships between, and for storing, binary light signals.

Digital computers, especially the arithmetic units of general-purpose computers, substantially comprise members for establishing logical relationships and stores. The members for establishing logical relationships (combinational members) implement OR functions and AND functions, partially with succeeding negation, so that NAND and NOR relationships are produced. However, such electrical combinational members are structurally complicated and hence expensive, even if they take the form of integrated circuits, for an essential feature of the computers or arithmetic units is their processing speed, i.e., the number of logical operations per second. Because the switching speed of each separate combinational element is limited, a large number of parallel operating combinational members are required. Since combinational members have substantially no storage function, a large number of parallel operating stores are required which are combined to form registers.

An apparatus is known, for example from L. A. Edelstein "Picture logic for "Bachus," a fourth-generation computer." The Computer Journal, volume 6, No. 2, July 1963, and A. W. Burks, Essays on Cellular Automata, University of Illinois Press, Urbana, Chicago, London 1970, in which a large number of signals are processed in parallel by optical means. However, the means described for establishing the logical relationships and for storing are expensive, provide manufacturing problems and are not very reliable.

The invention provides an arrangement which also is capable of processing a large number of signals in parallel but is structurally simple and reliable and has a very wide field of use. Thus, the invention relates to an arrangement for establishing logical relationships between, and for storing, binary optical light signals, the binary values of which are determined by the intensity of the light, in which arrangement a crystal which consists of a Pockels-effect material and has two major parallel faces, is provided on the inner of these faces with a dielectric mirror, while a photosensitive layer is disposed so as to face the dielectric mirror. The photosensitive layer, when illuminated by at least one optical light signal having a two-dimensional luminous intensity distribution in accordance with the binary values, produces a charge image corresponding to the luminous intensity distribution on the dielectric mirror. Each individual charge has a value such that, polarized light which is substantially normally incident on the outer of the two major faces of the crystal and is reflected at the dielectric mirror, emerges from the crystal with its plane of polarization rotated through 0° or through an integral multiple of 90°. According to the invention this arrangement is characterized in that at least two of the light signals which illuminate the arrangement in order to establish logical relationships, represent a plurality of binary elements in a preferably two-dimensional intensity distribution and in that in this manner the light signal which emerges from the crystal is the binary light signal incorporating the logical relationship. Preferably the crystal in a KDP crystal. The photosensitive layer may, for example, be a photocathode arranged so as to face the dielectric mirror with a given spacing, an interposed electron-optical system forming an image of the electron image of the photocathode on the dielectric mirror. However, the photosensitive layer may alternatively be in the form of a photosemiconductor coated on the dielectric mirror, resulting in a compact arrangement.

The above arrangement and extended and more elaborate embodiments thereof which will be described hereinafter enable the elementary logic combinational building blocks to be constructed. Examples are: negation, OR, AND and exclusive-OR functions.

The various features and advantages of the present invention will be apparent from the following description of embodiments thereof, taken in conjunction with the accompanying drawings, in which.

Figure 1:
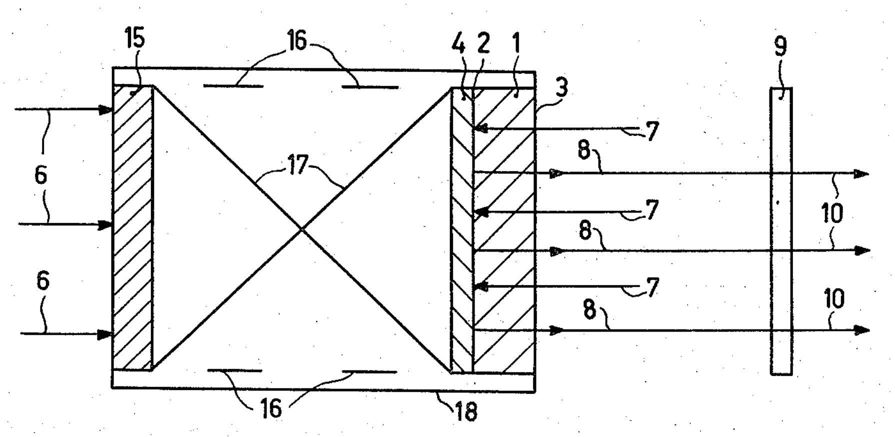
FIG. 1 shows schematically an arrangement according to the invention.

Referring now to FIG. 1, a crystal 1 consists of a Pockels-effect material. The Pockels-effect means that a polarized light ray which passes through the crystal has its plane of polarization rotated when an electric field is applied to the crystal in the direction of the light beam. Such a property is exhibited by, for example, a KDP crystal, which consequently is frequently used.

The crystal 1 is coated on the inner major face 2 with a dielectric mirror 4 which also is electrically insulating. In order to enable an applied charges image to be stored as long as possible, the insulation resistance of the mirror is to be as high as possible.

A photocathode 15 is disposed so as to face the dielectric mirror 4 with a given spacing. When a light signal 6 is incident on the photocathode 15, electrons are liberated in the photocathode in accordance with the luminous intensity and emerge from the rear face of the photocathode and by an electron-optical system 16 are directed in the form of electron beams onto the dielectric mirror 4, so that on this mirror a charges image is produced which corresponds to the light signal 6.

In this connection it should be pointed out that the thickness/length ratio of the individual components is not shown to scale and that in particular the dielectric mirror 4 and the photocathode 15 are considerably thinner than is shown.

A charge located at some point of the dielectric mirror 4 causes a corresponding electric field to be produced in the crystal 1 at this location. As a result, a polarized light signal 7 incident on the outer major surface 3 of the crystal 1 when passing through the crystal has its plane of polarization rotated at the said location, then is reflected at the dielectric mirror 4 and on its return passage through the crystal has its plane of polarization rotated further through an equal angle. When owing to the quantity of light of the light signal 6 the charge is such that the plane of polarization of the emerging light signal 8 at this location is rotated through 90° or an odd multiple of 90° relative to the plane of polarization of the incident light signal 7, with suitable adjustment of the plane of polarization of an analyzer 9 the said light passes freely through the analyzer and emerges from it as a light signal 10. If at a location of the dielectric mirror 4 there is no charge because the light signals contains no light at the corresponding location, the emerging light 8 does not have its plane of polarization rotated at this location and hence is at right angles to the plane of polarization of the analyzer 9 and consequently is not transmitted. Thus the light signal 10 emerging from the rear face of the analyzer is a direct image of the light signal 6 stored as a charge image on the dielectric mirror 4 and may be read out any mumber of times, i.e., as long as the charge image has not leaked away through the finite electric resistance of the dielectric mirror. The charge image can be erased by means of an electron shower from an electron source, not shown.

When the plane of polarization of the analyzer 9 is rotated through 90°, under the aforedescribed conditions only the light the plane of polarization of which has not been rotated and which consequently corresponds to locations of the light signal 6 which contain no light passes through the analyzer, whereas the light the plane of polarization of which has been rotated and which corresponds to the locations illuminated by the light signal 6 is intercepted by the analyzer. Thus the light signal 10 corresponds to the inverse of the light signal 6. The same effect may also be obtained in that in the quiescent condition, i.e., when there is no light signal 6, a quiescent charge is produced on the dielectric mirror which rotates the plane of polarization of the light which passes through the crystal 1 by 90° or an odd-multiple of 90°, the additional charges produced by a light signal 6 having values such that the rotation of the plane of polarization relative to the quiescent condition is increased by an additional 90° or an integral multiple thereof. Besides, to ensure maximum reliability a rotation by 90° only is preferably used, dispensing with the use of an integral multiple thereof. However, for a certain case a rotation of the plane of polarization through 180° is required, as will be described hereinafter.

Figure 2:
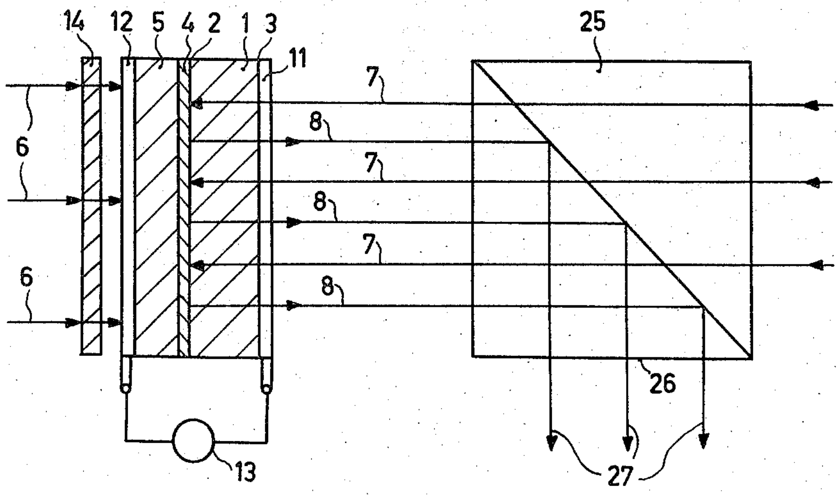
FIG. 2 shows schematically another embodiment according to the invention.

FIG. 2 shows another embodiment of the arrangement according to the invention. This arrangement also comprises a crystal 1 made of a Pockels-effect material one face 2 of which is coated with a dielectric mirror 4. This mirror in turn is directly coated with a photosemiconductor material 5. Both the outer face 3 of the crystal and the outer face of the photosemiconductor are coated with an electrically conductive transparent layer 11 and 12 respectively. The two electrically conductive layers are connected to a voltage source 13 the voltage of which enables the operation of the entire arrangement to be essentially influenced.

The photosemiconductor material 5 forms a high electric resistance which on illumination is greatly reduced at the illuminated locations. Hence, with sufficient duration of the illumination by a light signal 6 the resistance of the photosemiconductor becomes low at all the locations at which the light signal 6 contains light, and consequently it transfers the voltage applied to the conductive layer 12 to the surface of the dielectric mirror 4, causing the reproduction of a charge image which corresponds to the light signal. When the voltage of the voltage source 13 and hence the charge produced on the mirror 4 by illumination have values such that the plane-polarized light signal 7 incident on the face 3 of the crystal 1 emerges with its plane of polarization rotated through 90° or an odd multiple of 90° at the locations illuminated by the light signal 6, a succeeding analyzer permits an image to be obtained which corresponds to the light signal 6 or is the inverse thereof, depending upon the orientation of the plane of polarization of the analyzer. If the intensity of the light signal 7 incident on the crystal is high enough, an output light signal is produced the intensity of which is higher than that of the light signal 6, similarly to what has been described with respect to the preceding embodiment. Thus the arrangement may also operate as an image intensifier.

In FIG. 2 the analyzer takes the form of a polarizing beam splitter 25. Such a beam splitter has the property of transmitting plane-polarized light having a given plane of polarization, whereas light polarized at right angles thereto is reflected at the interface. Thus this component has the properties both of a polarizer and of an analyzer. In this arrangement the emerging light signal 27 is directionally separated from the incident lignt signal 7, since it emerges laterally from an exit face 26 of the component 25, however, the emerging light signal 27 can no longer be inverted relative to the light signal 6 by rotation of the analyzer. But this may be achieved in another manner.

Erasure of the stored charges image will now be described. For this purpose the voltage source 13 supplies a voltage 0 and the photosemiconductor 5 is illuminated by a uniformly intense light signal 6 for a sufficient time. Thus, the dielectric mirror 4 has the charge 0 through out its surface and a new charge image can be written when the voltage source 13 again supplies the aforementioned voltage.

However, when the voltage source 13 during erasure does not supply the voltage 0 but the aforementioned voltage which corresponds to a rotation through 90° of the plane of polarization of the light signal passing through the crystal both before and after reflection, and when furthermore for the purpose of writing a charge image which corresponds to the light signal 6 the voltage source 13 supplies a voltage which corresponds to a rotation through 180° of the plane of polarization of the light signal travelling through the crystal, i.e., about twice the said voltage, operation will be as follows: in the absence of a light signal 6 the light signal 8 which emerges from the crystal is rotated through 90° relative to the light signal 7 and hence emerges from the exit face 26 of the beam splitter 25. In the case of illumation by a light signal 6, however, the light travelling through the crystal is rotated through 180° and does not emerge from the exit face 26 of the beam splitter 25. In this case the light signal 27 emerging from the beam splitter is the inverse of the image of the light signal 6.

Figure 3:
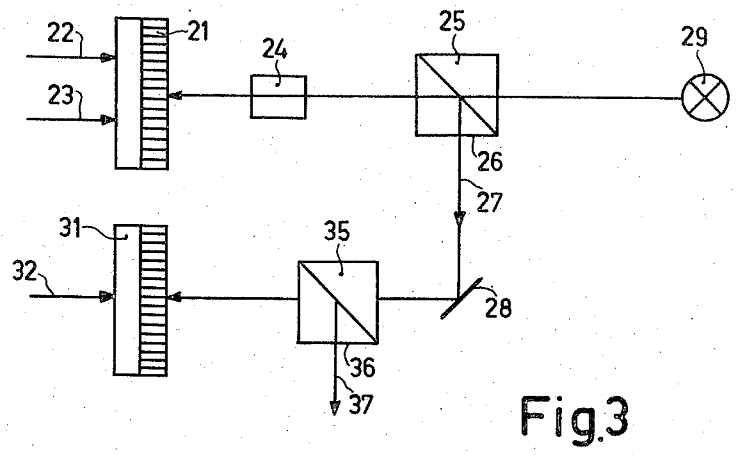
FIG. 3 shows an arrangement for establishing logical relationships between, and for negating, signals.

Another manner of inversion is shown in FIG. 3 of which first the upper half only will be considered. A light source 29 illuminates a component 21 which corresponds to the arrangement comprising the crystal and the photosensitive layer shown in FIG. 1 or FIG. 2. The crystal is indicated by the shaded side of the element 21. The light passes through the aforedescribed polarizing beam splitter 25 and through a component 24 which rotates the plane of polarization of the light traversing it through 45°. If now, in the case of a corresponding quiescent condition of the component 21 owing to the choice of the conditions of erasure described hereinbefore, in the absence of the signals 22 and 23 the light which emerges again from the component 21 does not have its plane of polarization rotated, it consequently passes twice through the component 24 and hence is rotated through 90° and appears at the exit face 26 as a light signal 27. If now a signal 22 or 23 causes the light which emerges from the component 21 to have its plane of polarization rotated through 90° relative to the incident light, the light reflected to the beam splitter 25 is rotated through 180° relative to the light passing through before reflection, and hence does not appear at the exit face 26. Consequently, this also produces inversion of the light signal 22 or 23. When the component 24 also is a KDP crystal to which a voltage is applied such that the plane of polarization of light passing through it is rotated through 45°, the function of the arrangement shown can be set to normal or to inverting by merely switching the voltage on or off.

Hitherto the storage function and the inversion function corresponding to logical negation only have been discussed. To simplify the discussion of the establishment of logical relationships it is assumed that logical 0 corresponds to no light and logical 1 corresponds to light having an intensity in a predetermined range.

FIG. 3 shows two signals 22 and 23 both incident on the photosensitive layer of the component 21. The operational conditions of the component 21 are assumed to be chosen so that the logic digit 1 produces saturation of the photosensitive layer and of the charges image, so that the charge is not increased further by prolonging the illumination or increasing the intensity, as has been described hereinbefore. Hence, if at a location in both signals 22 and 23 there is a luminous intensity, the overall intensity at this location on the photosensitive layer is doubled, however, the charge is not increased. Thus the following cases occur, which are described in the form of a Table where "dark" means no light and hence corresponds to the logic digit 0 and "bright" corresponds to the logic digit 1. The resulting conditions are shown by the following table, which relates to the aforedescribed conversion of the charge image into an intensity image at the exit face 26 of the beam splitter 25:

| Signal 22 | Signal 23 | Signal 27 |
|---|---|---|
| dark | dark | dark |
| bright | dark | bright |
| dark | bright | bright |
| bright | bright | bright |
| or, written in logic signals: | | |
| 0 | 0 | 0 |
| 1 | 0 | 1 |
| 0 | 1 | 1 |
| 1 | 1 | 1 |

As the table shows, an OR function is obtained. Initially component 24 has been left out of consideration. If such a component which rotates the plane of polarization of the traversing light by 45° is inserted or switched on, the signal 27 represents the NOR relationship of the two input signals 22 and 23, as may readily be deduced. This light signal 27 may be used similarly to the light signals 22 and 23, i.e., it may also, as the case may be after deflection by mirrors, be directed onto the photosensitive layer of another element, or, for special purposes, onto the photosensitive layer of the same component 21. This is possible because the combinational component 21 also has a storage effect, as has been described hereinbefore, so that the two signals 22 and 23 may succeed one another.

Although it was not expressly mentioned, in the above-discussion it has been assumed that the light which illuminates the crystal of an element 21 has a uniform intensity distribution, as will be the case with the source of light 29 shown in FIG. 3. This light source may be a laser of a light-emitting diode, which may be controlled. However, the light signal 27 may alternatively be the light signal which illuminated the crystal of a component 31, especially as it has already been polarized, which alternative case is also shown in FIG. 3. In such an arrangement the light signal 27 is directed by means of a deflecting mirror 28 onto a polarizing beam splitter which obviously must be adjusted so that the light signal 27 incident with a given polarization is capable of passing through the beam splitter 35 and striking the element 31. The disposition of the beam splitter 35 shown in FIG. 3 is used for simplicity only, for under these conditions it cannot operate correctly, but it should be rotated through 90° about the deflected light signal 27 so that the exit face 37 of this beam splitter extends parallel to the plane of the drawing, any light signal 37 which may be produced travelling at right angles to the place of the drawing. However, alternatively there may be inserted into the path of the light signal 27 a component which rotates its plane of polarization through 90°.

The photosensitive layer of the 31 then is illuminated by a signal 32. With suitable operating conditions of the element 31, which were described hereinbefore, a light signal 37 will be produced only if both a light signal 27 and a light signal 32 are present. If the light signals 22, 23, 27, 32 and 37 are designated by A, B, C, D and C respectively, the following logical functions are obtained:

$$C = A + B \qquad C' = \overline{A + B} = \overline{A} \cdot \overline{B}$$
$$E = C \cdot D = (A + B) + D \qquad E' = C' \cdot D = \overline{A} \cdot \overline{B} \cdot C$$

The dashed result symbol indicated the function which is produced when the element 24 is inserted or switched on with the aforedescribed effect. Hence it may be seen from the function that an AND function is obtained when the output signal of an element, i.e., the light emerging again from the crystal, is used to illuminate the crystal of another component. However, this logical relationship is not stored in this other component. In the example described the component 21 need not establish a logical relationship, but alternatively only one of the two signals 32 and 33 may be present. By including further components which correspond to the component 24 at other locations, further functions may be realized.

As mentioned hereinbefore the light signals described so far contain a plurality of binary elements in a two-dimensional intensity distribution of the light, so that to each area element on the photosensitive layer a given binary element is assiged. Consequently the light signals must be adjusted so that each binary element is directed onto the associated area element of the photosemiconductor. However, this cannot be exactly effected in practice, but in the case of a slightly incorrect adjustment the signal emerging from the crystal will be equally shifted. If this shifted signal is directed onto the photosensitive layer of a further component and there is again shifted with respect to the required position, the two shifts may be added. When a signal passes through several components this may result in a shift such that eventually the signal of a binary element occurs on that area element of the photosensitive layer which is assigned to the adjoining binary element. If at this location a logical relationship is established between it and a light signal which is set substantially correctly, a wrong logical relationship is established. To avoid this possibility, in the arrangement shown in FIG. 2 the photosensitive layer is preceded by means 14 which forms an average of the intensity of the light in a region associated with a binary element, namely the area element on the photosensitive layer. The means 14 may comprise a plurality of collecting lenses or ground-glass plates which are arranged in accordance with the distribution of the binary elements in the light signal. This ensures that only the regions or area elements associated with a binary element are illuminated or evenly illuminated, respectively. A light signal which is shifted with respect to its prescribed position on the photosensitive layer then can no longer alter the correct position of the light signal which emerges from the crystal, but in the worst case there is only a slight loss of light. However, because it was assumed that the photosensitive layer was operated in the saturation range, as was described hereinbefore, these light losses do not adversely affect operation.

Figures 4, 5:
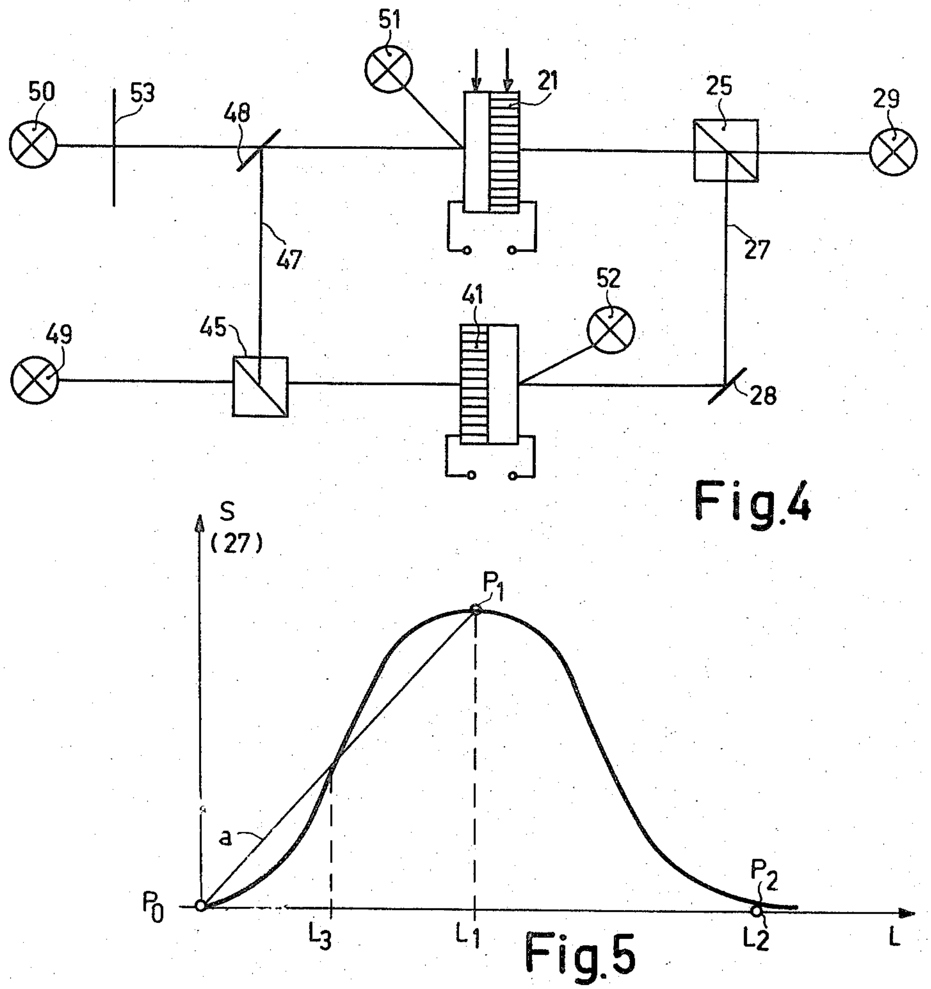
FIG. 4 shows an analogue-to-digital converter.
FIG. 5 shows a characteristic curve of the arrangement according to the invention.

Alternatively, however, the component may be operated so that the photosensitive layer does not operate in the saturation range. This is effected in that, for example, in the component shown in FIG. 2 the voltage source 13 produces a voltage which when fully operative on the crystal produces a rotation of the light traversing the crystal through an angle which greatly exceeds 90° and is at least 180°, the light signal 6 incident on the photosemiconductor layer 5 causing a charge on the dielectric mirror 4 which is only a fraction of the maximum charge. This is illustrated by the diagram of FIG. 5. In the diagram the intensity S of the signal 27 is plotted against the quantity of light L of the signal 6. The term "quantity of light" is used herein to mean the product of the luminous intensity and its duration. Erasure may be effected in that the plane of polarization of the light passing through the crystal is not rotated, i.e., no charge is present on the dielectric mirror. If then a given quantity of light impinges on the photosensitive layer, there is produced on the dielectric mirror a substantially proportional charge which causes a corresponding rotation of the plane of polarization. It is assumed that at a quantity of light $L_1$ which corresponds to the binary 1 a rotation through exactly 90° is obtained, so that the intensity of the emerging light signal 27 just is a maximum in the point $P_1$. Hence a luminous intensity $L_2$ of twice this value will produce a substantially doubled charge on the dielectric mirror which causes the plane of polarization to be rotated through 180°, with the result that the intensity of the emerging light signal 27 is substantially a minimum in the point $P_2$. The double luminous intensity may be produced, for example, by an area element being illuminated by two signals which each correspond to binary 1. If in the arrangement shown in FIG. 3 it is assumed that the component 21 is operated under the described conditions and neither of the light signals 22 and 23 contains any luminous intensity at an area element, the emerging light signal 27 at this location does not have any intensity either, assuming for the present that the component 24 is not included. If only one of these two light signals 22 and 23 has a luminous intensity which corresponds to binary 1 at an area element, this area element receives the quantity of light $L_1$ and consequently the emerging light signal 27 at this location is a maximum which corresponds to binary 1. If, however, both light signals 22 and 23 have the intensity which corresponds to binary 1 at an area element, this area element receives the entire quantity of light $L_2$, so that the emerging light signal 27 at this location is a minimum which corresponds to binary 0. Thus an exclusive-OR function is achieved. However, this requires that the luminous intensity and the duration of the two light signals 22 and 23 should lie within narrow limits.

FIG. 5 also illustrates how a light signal the intensities of which do not exactly correspond to the binary signals will be nearer to these values after passing through one of the components described. When a quantity of light is smaller than the quantity $L_3$ which corresponds to the point of intersection of a straight line G and the characteristic curve of the component, the emerging light signal is reduced in a large degree, whereas if the quantity of light incident on the photosensitive layer exceeds the quantity of light $L_3$ the emerging quantity of light is proportionately increased. Thus small discrepancies of the light signals due, for example, to inaccurate adjustments are continually corrected, which effect corresponds to the disturbance voltage distance in electronic digital circuit arrangements.

Thus an analogue-to-digital converter also may be realized, as is shown in FIG. 4. In the arrangement shown in FIG. 4 a source of light 50 illuminates a picture 53 an image of which is formed on the photosensitive layer of the component 21, the path of the radiation including a beam splitting mirror 48 the effect of which will be described hereinafter. If then the source of light 29 is switched on, the light signal 27 which emerges from the splitter 25 has become brighter at the bright locations of the picture and darker at the dark locations thereof. The signal 27 is directed by the mirror 28 onto the photosensitive layer of a second component 41 and simultaneously the component 21 is erased by switching on a source of light 51 and applying a corresponding voltage. If now a source of light 49 is switched on, a light signal 47 which emerges from a beam splitter 45 has become darker at the dark locations and brighter at the bright locations of the picture 53. The light signal 47 may be directed again onto the photosensitive layer of the component 21 by the beam splitting mirror 48, whereupon the component 41 is erased by switching on a source of light 52. This operation may be repeated until satisfactory digitizing has been obtained. The control of the light sources and of the voltage sources associated with the components 21 and 41 preferably is performed by an electronic computer which thus processes the program, so that the data only are optically processed.

What is claimed is:

1. Arrangement for establishing logical relationships between, and for storing, binary light signals, the binary value of which is determined by the intensity of the light, of the type wherein a crystal (1) which is made of a Pockels-effect material and has two parallel major faces (2, 3) is provided with a dielectric mirror (4) on its inner major surface (2) and furthermore a photosensitive layer means (5 or 15 respectively) arranged so as to face the dielectric mirror (4) for producing on the dielectric mirror a charge image which corresponds to a luminous intensity distribution when illuminated by at least one light signal (6), having a two-dimensional luminous intensity distribution corresponding to binary values, the individual charges being such that a beam of polarized light (7), which is substantially normally incident on the outer major face (3) of the crystal (1) and is reflected from the dielectric mirror, emerges from the crystal (1) and light (8), the plane of polarization of which is rotated through an integral multiple of 90°, the improvement wherein at least two of the light signals which illuminate this arrangement represent a plurality of binary elements in a preferably two-dimensional intensity distribution for establishing logical relationships, and that the light signal (8) which emerges from the crystal (1) is the binary light signal which represents the resulting logical relationhip.

2. Arrangement as claimed in claim 1, characterized in that the crystal (1) is a KDP crystal.

3. Arrangement as claimed in claim 1, characterized in that the photosensitive layer is a photocathode (15) and in that there is inserted between this photocathode and the dielectric mirror (4) an electron-optical system (16) which projects an image of the electron image produced by the photocathode onto the dielectric mirror.

4. Arrangement as claimed in claim 1, characterized in that the photosensitive layer (5, 15) is preceded by an component means (14) for forming an average of the intensity of the light in each range associated with a binary element.

5. Arrangement as claimed in claim 1, in which the photosensitive layer is a photosemiconductor (5) which is directly deposited on the dielectric mirror (4) and the outer major face (3) of the crystal (1) and the surface of the photosemiconductor (5) remote from said face are both coated with a transparent electrically conducting layer (11 and 12 respectively), further comprising a voltage source means (13) for producing a voltage such that in the absence of illumination of the photosemiconductor (5) the light signal incident on the crystal (1) appears at the output (26) of an anal (25).

6. Arrangement as claimed in claim 1, characterized in that the crystal (1) of a component (21) comprising the crystal and the photosensitive layer is preceded by a component means (24) for rotating the plane of polarization of the light signal passing through it through 45°, so that in the absence of illumination of the photosensitive layer the light signal incident on the crystal of the component (21) appears at the output (26) of the analyzer (25).

7. Arrangement as claimed in claim 1, characterized in that to realize an OR function the apparatus further comprises means for directing light signals between which a logical relationship is to be established onto the photosensitive layer (5 or 15 respectively) their directions being such that even at an intensity which corresponds to a binary value "1" saturation of the photosensitive layer is effected and the charge produced on the dielectric mirror (4) is not appreciably changed on increase of the intensity.

8. Arrangement as claimed in claim 1, characterized in that the light (7) incident on the outer major face (3) of the crystal (1) also is a signal for establishing a logical relationship, so that an AND function is realized.

9. Arrangement as claimed in claim 1, characterized in that for realizing an exclusive-OR function the light signals between which a logical relationship is to be established are superimposed in terms of intensity on the photosensitive layer (5 or 15 respectively) and their duration is such that at an intensity which corresponds to a binary value 1 the rotation of the plane of polarization of the light ray which traverses the crystal is 90° or an odd multiple of 90°, while in the case of doubled intensity this rotation is 180° or an integral multiple of 180°.

* * * * *

UNITED STATES PATENT OFFICE
CERTIFICATE OF CORRECTION

Patent No. 3,859,639 Dated January 7, 1975

Inventor(s) UWE HELM

It is certified that error appears in the above-identified patent and that said Letters Patent are hereby corrected as shown below:

ON THE TITLE PAGE

"[30] Foreign Application Priority Data

August 23, 1972 Germany.............2241461"

should read

--[30] Foreign Application Priority Data

August 23, 1972 Germany............P.2241461.5--;

Col. 8, line 17, after "a" should be --disproportionately-

Claim 5, line 11, "anal" should be --analyzer--;

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*